United States Patent
Zhang et al.

(10) Patent No.: US 12,388,113 B2
(45) Date of Patent: Aug. 12, 2025

(54) DIAPHRAGM AND HIGH-VOLTAGE BATTERY COMPRISING SAME

(71) Applicant: Zhuhai CosMX Battery Co., Ltd., Zhuhai (CN)

(72) Inventors: Zulai Zhang, Zhuhai (CN); Suli Li, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 606 days.

(21) Appl. No.: 17/744,633

(22) Filed: May 14, 2022

(65) Prior Publication Data

US 2022/0271329 A1    Aug. 25, 2022

Related U.S. Application Data

(63) Continuation of application No. PCT/CN2020/128134, filed on Nov. 11, 2020.

(30) Foreign Application Priority Data

Nov. 14, 2019   (CN) .......................... 201911115315.X

(51) Int. Cl.
| | |
|---|---|
| H01M 10/00 | (2006.01) |
| H01M 10/0525 | (2010.01) |
| H01M 50/403 | (2021.01) |
| H01M 50/451 | (2021.01) |

(52) U.S. Cl.
CPC ..... *H01M 10/0525* (2013.01); *H01M 50/403* (2021.01); *H01M 50/451* (2021.01)

(58) Field of Classification Search
CPC ................................ H01M 10/00; H01M 4/00
See application file for complete search history.

(56) References Cited

FOREIGN PATENT DOCUMENTS

| CN | 103078075 A | 5/2013 |
|---|---|---|
| CN | 103545472 A | 1/2014 |
| CN | 103956451 A | 7/2014 |

(Continued)

OTHER PUBLICATIONS

Bao et al., A Modified Super-paramagnetic Ferroferric Oxide Nano-particle Preparation Method And Application, Apr. 2018, See the Abstract. (Year: 2018).*
International Search Report mailed Feb. 10, 2021 in PCT/CN2020/128134.
The first Office Action mailed in Chinese Patent Application No. 201911115315.X.

(Continued)

*Primary Examiner* — Anca Eoff
*Assistant Examiner* — Monique M Wills
(74) *Attorney, Agent, or Firm* — Kilpatrick Townsend & Stockton LLP

(57) ABSTRACT

A diaphragm and a high-voltage battery including the diaphragm. A modification layer is coated on a surface of an inorganic ceramic particle, the modification layer can adsorb transition metal ions precipitated from an electrode material, thereby preventing the transition metal ions from forming transition metal precipitates on a surface of a negative electrode and improving safety, rate performance and cycle performance of the battery. At the same time, since the modification layer is coated on the surface of the inorganic ceramic particle, thus it will not have a significant impact on an internal resistance of the battery, and thereby not reducing the rate, low temperature, and cycle performances of the battery.

18 Claims, 2 Drawing Sheets

(56) References Cited

FOREIGN PATENT DOCUMENTS

| | | | | | |
|---|---|---|---|---|---|
| CN | 104054195 | A | 9/2014 | | |
| CN | 104934606 | A | 9/2015 | | |
| CN | 105206798 | A | 12/2015 | | |
| CN | 105440770 | A | 3/2016 | | |
| CN | 105849936 | A | 8/2016 | | |
| CN | 106519742 | A | 3/2017 | | |
| CN | 105688821 | B | * 4/2018 | ............ | B01J 20/223 |
| CN | 107925039 | A | 4/2018 | | |
| CN | 108305972 | A | 7/2018 | | |
| CN | 109192903 | A | 1/2019 | | |
| CN | 109285982 | A | 1/2019 | | |
| CN | 109616604 | A | 4/2019 | | |
| CN | 109841779 | A | 6/2019 | | |
| CN | 110323395 | A | 10/2019 | | |
| CN | 111029514 | A | 4/2020 | | |
| JP | 2007246913 | A | 9/2007 | | |
| WO | 2017032304 | A1 | 3/2017 | | |
| WO | 2018233269 | A1 | 12/2018 | | |

OTHER PUBLICATIONS

First Office Action received in the corresponding Chinese Application 202080077087.6, mailed May 12, 2023.

Supplementary European Search Report received in the corresponding European Application 20886697.0, mailed Nov. 21, 2022.

First Office Action received in the corresponding European Application 20886697.0, mailed Nov. 21, 2022.

Kumar R et al: "EDTA functionalized silica for removal of Cu (II), Zn (II) and Ni(II) from aqueous solution", Journal of Colloid and Interface Science, Academic Press, Inc, US, vol. 408, Jul. 27, 2013 (Jul. 27, 2013), pp. 200-205, XP028697358, ISSN: 0021~9797, DOI: 10.1016/J.JCIS.2013.07.019.

Cho Jinhyun et al: "High performance separator coated with amino-functionalized SiO2particles for safety enhanced lithium-ion batteries", Journal of Membrane Science, Elsevier BV, Nl, vol. 535, Apr. 21, 2017 (Apr. 21, 2017), pp. 151-157, XP085015468, ISSN: 0376-7388, DOI: 10.1016/J.MEMSCI.2017.04.042.

* cited by examiner

DIAPHRAGM AND HIGH-VOLTAGE BATTERY COMPRISING SAME

CROSS-REFERENCE TO RELATED APPLICATIONS

This application is a continuation of International Application No. PCT/CN2020/128134, filed on Nov. 11, 2020, which claims priority to Chinese Patent Application No. 201911115315.X, filed with the China National Intellectual Property Administration on Nov. 14, 2019. Both of the above applications are hereby incorporated by reference in their entireties.

TECHNICAL FIELD

The present application pertains to the technical field of lithium-ion batteries, in particular to, a diaphragm suitable for a high-voltage battery system and a battery including the diaphragm.

BACKGROUND

With the popularity of 3C products and the rise of the electric vehicle market, the demand for a lithium-ion secondary battery is increasing. As some magnetic metal particles or metal ions are inevitably mixed into a whole battery system, these magnetic metal particles or metal ions will precipitate on a surface of a negative electrode during battery charging and discharging; in addition, the positive electrode material itself is also subject to a dissolution out of transition metal ions, and the dissolved transition metal ions will also precipitate on the surface of the negative electrode; especially in a high-voltage battery system, such precipitation is more serious.

The metal particles precipitated on the surface of the negative electrode, on one hand, produce metal dendrites, which are easy to pierce a diaphragm and cause an internal short circuit of the battery; on the other hand, affect normal insertion of lithium ions, affecting long-term cycle, and other performance of the battery.

Due to the above problems of the precipitated magnetic metal particles or metal ions (including transition metal ions), it has been reported in the prior art that the transition metal ions are adsorbed by using porous ceramic particles. This has an adverse effect on the electrical performance due to high moisture content caused by the use of porous ceramic particles. It has also been reported in the prior art that a transition metal ion adsorption layer is added on a surface of a ceramic diaphragm. This not only increases a manufacturing cost of the diaphragm, but also deteriorates an ion conductivity due to an addition of the transition metal ion adsorption layer, thereby deteriorating performance of the battery such as cycle, and charge and discharge rate.

SUMMARY

Diaphragm is an essential element in a lithium-ion secondary battery. Its main functions are: on one hand, it acts as a separator between a positive electrode and a negative electrode to prevent a short circuit between the positive electrode and negative electrode and ensure the safety of the battery; on the other hand, it acts as a lithium ion channel between the positive electrode and negative electrode to ensure a normal operation of the battery. However, the inventor of the present application, after extensive experimental research, believes that with people's continuous pursuit of battery performance, the diaphragm, as one of the key materials of the battery, should play a greater role.

In order to improve the shortcomings in the prior art, an object of the present application is to provide a ceramic particle, a diaphragm and a battery including the ceramic particle.

As shown in FIG. 2, the present application is to coat a surface of an inorganic ceramic particle with a modification layer, the modification layer can adsorb metal ions existing in a battery system (such as transition metal ions precipitated from a positive electrode material, metal ions or metal particles incorporated in the battery system), so as to prevent metal ions from forming a metal precipitate on a surface of the negative electrode and to improve the safety, rate, cycle and other performances of the battery. At the same time, since the modification layer is coated on the surface of the inorganic ceramic particle, it will not have a significant impact on an internal resistance of the battery, thereby not reducing the rate, low temperature, and cycle performances of the battery.

The object of the present application is realized through the following technical solution:

a ceramic particle, where as shown in FIG. 2, the ceramic particle has a core-shell structure, that is, the ceramic particle includes a shell layer and a core, a material forming the shell layer includes a modification material, and a material forming the core includes an inorganic ceramic material;

the modification material is selected from a substituted siloxane, and a compound for forming a substituent is selected from a carboxyl-containing amine compound or a nitrogen-containing heterocyclic compound.

According to the present application, the carboxyl-containing amine compound is selected from, for example, a polyamine compound containing at least two carboxyl groups, or, for example, one or more of ethylenediamine tetraacetic acid, propylene diamine tetraacetic acid, hydroxyethyl ethylenediamine triacetic acid, and ethylene glycol diethyl ether diamine tetraacetic acid.

According to the present application, the nitrogen-containing heterocyclic compound is selected from, for example, a heterocyclic compound containing one or two nitrogen, for example, one or two of pyridine and imidazole.

According to the present application, the siloxane is selected from an amino-containing siloxane; where the substituted siloxane is obtained by replacing the amino in the siloxane with the above compound. The amino-containing siloxane is, for example, one or more of 3-aminopropyl trimethoxysilane, 3-aminopropyl triethoxysilane, 2-aminoethyl trimethoxysilane, and 2-aminoethyl triethoxysilane.

According to the present application, the ceramic particle can be used in the field of lithium-ion batteries.

According to the present application, the inorganic ceramic material is selected from one or more of alumina, magnesium oxide, boehmite, barium sulfate, barium titanate, zinc oxide, calcium oxide, silicon dioxide, silicon carbide, and nickel oxide.

According to the present application, the shell layer is also known as a modification layer.

According to the present application, a thickness of the shell layer is 5 nm-1000 nm, preferably 50 nm-500 nm, for example, 5 nm, 10 nm, 50 nm, 100 nm, 200 nm, 500 nm or 1000 nm.

According to the present application, an average particle diameter of the inorganic ceramic material is 0.01 μm-20 μm, for example, 0.01 μm, 0.05 μm, 0.1 μm, 0.5 μm, 1 μm, 4 μm, 5 μm, 8 μm, 10 μm, 12 μm, 15 μm, 18 μm or 20 μm.

According to the present application, in the ceramic particle, the modification layer (i.e., the shell layer) formed by the modification material that is coated on the surface of the inorganic ceramic material can adsorb transition metal ions precipitated from the positive electrode, so as to prevent the transition metal ions from forming transition metal precipitates on the surface of the negative electrode and improve the safety, rate performance, cycle performance and other performance of the battery.

The present application further provides a preparation method of the above ceramic particle, including the following steps:

coating, by a silanization treatment method, a material for forming a shell layer and including a modification material on a surface of a material for forming a core and including an inorganic ceramic material to prepare the ceramic particle; where the ceramic particle has a core-shell structure, i.e., including the shell layer and the core, the material for forming the shell layer includes the modification material, and the material for forming the core includes the inorganic ceramic material.

Exemplarily, the silanization treatment method includes the following steps:

adding the material forming the shell layer to a solvent under stirring to form a solution containing the material for forming the shell layer; adding the material for forming the core into the solution, stirring and mixing evenly to obtain a mixed system; removing the solvent in this mixed system through vacuum-heating drying or spray drying to obtain the ceramic particle, where the ceramic particle has a core-shell structure, i.e., including the shell layer and core, and the material for forming the shell layer includes a modification material, and the material for forming the core includes an inorganic ceramic material.

Where the solvent is selected from an alcohol organic solvent, which is, specifically, at least one of methanol, ethanol, propanol, ethylene glycol, propylene glycol, and glycerol. For example, in an embodiment of the present application, the preparation of the above ceramic particle includes the following steps:

as shown in FIG. 1, dissolving a substituted siloxane (i.e., B in FIG. 1, where M is a substituent of siloxane) in a solvent (ethanol) under stirring to form a mixed solution, adding an inorganic ceramic material (aluminum oxide material, i.e., A in FIG. 1), and after stirring and mixing evenly, removing the solvent in a mixture to obtain the particle of the ceramic material that was coated by the modification material (C in FIG. 1).

The present application further provides a diaphragm, as shown in FIG. 3, the diaphragm includes a diaphragm base layer (e.g., substrate as shown in FIG. 3), and a coating layer located on at least one surface of the diaphragm base layer. The coating layer is obtained by coating the mixed system containing the above ceramic particle on at least one surface of the diaphragm base layer (e.g., coating layer formed by a modified ceramic and a binder as shown in FIG. 3).

According to the present application, a thickness of the coating layer is 1-10 µm, for example, 2-5 µm, such as 1 µm, 2 µm, 3 µm, 4 µm, 5 µm, 6 µm, 7 µm, 8 µm, 9 µm, or 10 µm. The coating layer within this thickness range can be obtained by one coating or multiple coating.

According to the present application, if the diaphragm includes a diaphragm base layer and coating layers located on both surfaces of the diaphragm base layer, the thicknesses of the coating layers on both surfaces are the same or different.

According to the present application, the mixed system further includes at least one of a polymer binder and an additive. For example, the mixed system further includes the polymer binder and the additive.

According to the present application, parts by mass of each component in the mixed system are as follows:

50-95 parts by mass of the ceramic particle, 5-40 parts by mass of the polymer binder, and 0-10 parts by mass of the additive.

For example, parts by mass of each component in the mixed system are as follows:

60-95 parts by mass of the ceramic particle, 10-30 parts by mass of the polymer binder, and 0-5 parts by mass of the additive.

Exemplarily, the parts by mass of the ceramic particle are 50, 55, 60, 65, 70, 75, 80, 85, 90 or 95.

Exemplarily, the parts by mass of the polymer binder are 5, 6, 7, 8, 9, 10, 15, 20, 25, 30, 35 or 40.

Exemplarily, the parts by mass of the additive are 1, 2, 3, 4, 5, 6, 7, 8, 9 or 10.

Specifically, a mass ratio of the shell layer to the core can be (20-100):200.

According to the present application, the mixed system further includes 100-5000 parts by mass of a solvent, for example, 500-2000 parts by mass of the solvent.

According to the present application, the polymer binder is selected from one of such as polytetrafluoroethylene, polyvinylidene fluoride, polyvinylidene fluoride-hexafluoropropylene, polyimide, polyacrylonitrile, polymethyl methacrylate, aramid resin, poly(meth)acrylic acid, styrene butadiene rubber (SBR), polyvinyl alcohol, polyvinyl acetate, carboxymethylcellulose (CMC), sodium carboxymethyl cellulose (CMC-Na), carboxyethyl cellulose, polyacrylamide, phenolic resin, epoxy resin, waterborne polyurethane, ethylene-vinyl acetate copolymer, polyacrylic acid copolymer, lithium polystyrene sulfonate, waterborne silicone resin, nitrile-polyvinyl chloride blend, styrene acrylic latex, pure benzene latex and blended and copolymerized polymers that are derived from modification of the above polymers, or a combination of more thereof.

According to the present application, the additive is selected from at least one of multi-branched chain alcohol, triethyl phosphate, polyethylene glycol, fluorinated polyethylene oxide, polyethylene oxide, stearic acid, sodium dodecylbenzene sulfonate, sodium cetyl sulfonate, fatty acid glyceride, sorbitan fatty acid ester, and polysorbate.

According to the present application, the solvent is selected from at least one of water, methanol, ethanol, acetone, N-methyl-2-pyrrolidone (NMP), chloroform, xylene, tetrahydrofuran, o-chlorobenzaldehyde, hexafluoroisopropanol, N,N-dimethylformamide, N,N-dimethylacetamide, butanone, and acetonitrile.

The present application further provides a preparation method of the diaphragm, where the method includes the following steps:
 (a) adding the ceramic particle, optionally the polymer binder and optionally the additive to a solvent and mixing to obtain a mixed slurry; and
 (b) coating the mixed slurry of step (a) on a surface of a diaphragm base layer and drying to obtain the diaphragm.

According to the present application, in step (a), parts by mass of the ceramic particle, optionally the polymer binder, optionally the additive, and the solvent in the mixed slurry are as follows:

50-95 parts by mass of the ceramic particle, 5-40 parts by mass of the polymer binder, 0-10 parts by mass of the additive, and 100-5000 parts by mass of the solvent.

For example, parts by mass of each component in the mixed system are as follows:

60-95 parts by mass of the ceramic particle, 10-30 parts by mass of the polymer binder, 0-5 parts by mass of the additive, and 500-2000 parts by mass of the solvent.

According to the present application, in step (b), the method for coating is, for example, spray coating, dip coating, gravure coating, extrusion coating, transfer coating, and the like.

According to the present application, in step (b), the diaphragm base layer has a porosity of 20%-80%, a thickness of 5 μm-50 μm, and an average pore size of D<80 nm; a material system of the diaphragm base layer is selected from at least one of polyethylene, polypropylene, polyethylene terephthalate, polybutylene terephthalate, polystyrene, polynaphthalene-based polymer, polyimide, polyamide, aramid, poly-p-phenylene benzodiazole, and the like.

The present application further provides a lithium-ion battery, including the above-mentioned diaphragm.

According to the present application, as shown in FIG. 3, a jelly-roll of the above-mentioned lithium-ion battery is formed by stacking a positive electrode, a negative electrode and the above-mentioned diaphragm; and the lithium-ion battery further includes an electrolyte.

According to the present application, the lithium-ion battery is a high-voltage lithium-ion battery.

Beneficial effects of the present application: the present application provides a diaphragm and a high-voltage battery including the diaphragm. The present application can improve safety, rate performance and cycle performance of the battery by coating a modification layer on a surface of an inorganic ceramic particle, where the modification layer can adsorb transition metal ions precipitated from an electrode material, thereby preventing the transition metal ions from forming transition metal precipitates on a surface of a negative electrode. At the same time, since the modification layer is coated on the surface of the inorganic ceramic particle, thus it will not have a significant impact on an internal resistance of the battery, thereby not reducing the rate, low temperature, and cycle performances of the battery. Moreover, the inventor unexpectedly found that an introduction of the modification material can also realize adsorption of trace HF produced in a battery system, which, on one hand, can inhibit dissolution of the transition metal ions, stabilize a surface structure of a positive electrode, and improve the performance of the battery; on the other hand, can reduce a corrosion of HF on a battery cover material and improve the safety performance of the battery.

DESCRIPTION OF EMBODIMENTS

Figure 1:
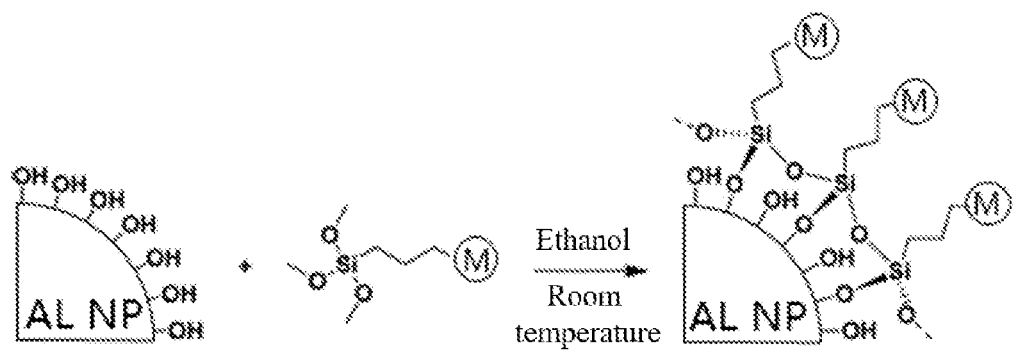
FIG. 1: a schematic diagram of a modification reaction of a ceramic particle of the present application.
Figure 2:
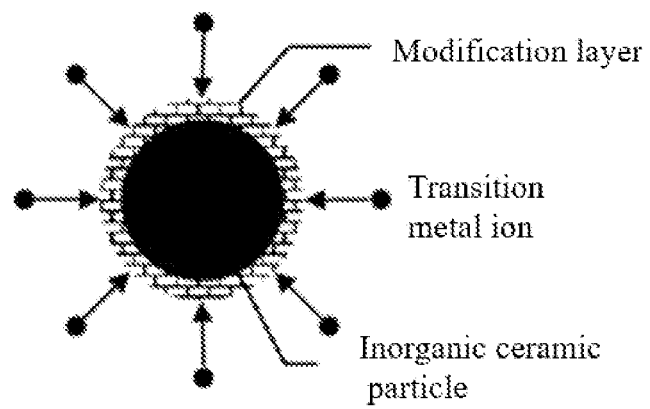
FIG. 2: a schematic diagram of adsorbing transition metal ions by a ceramic particle of the present application.
Figure 3:
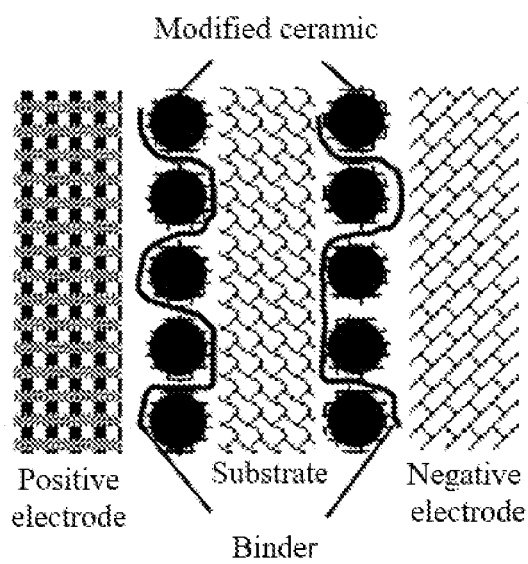
FIG. 3: a schematic diagram of a battery cell structure of a lithium-ion battery of the present application.

The preparation method of the present application will be further described in detail below in combination with specific examples. It should be understood that the following examples are only to exemplarily illustrate and interpret the present application, and should not be interpreted as limiting the protection scope of the present application. All technical solutions realized based on the above contents of the present application are within the protection scope of the present application.

The experimental methods used in the following examples are conventional methods unless otherwise specified; reagents, materials and the like used in the following examples can be obtained from commercial sources unless otherwise specified.

Example 1

20 parts of a modification material were dissolved in ethanol under stirring to form a mixed solution, and 200 parts of aluminum oxide were added. After stirring and mixing evenly, the solvent in the mixture was removed by vacuum-heating drying technology to obtain a particle of a ceramic material coated with the modification material. The modification material was selected from ethylenediamine tetraacetic acid substituted 3-aminopropyl trimethoxysilane.

In the prepared ceramic particle, a shell layer was a modification material containing ethylenediamine tetraacetic acid substituted 3-aminopropyl trimethoxysilane, and a core was aluminum oxide; a mass ratio of the shell layer to the core was 20:200, a thickness of the shell layer was 10 nm, and an average particle diameter of the ceramic particle was about 0.8 μm.

80 parts of the ceramic particle prepared above, 20 parts of polyvinylidene fluoride-hexafluoropropylene and 2 parts of polyethylene glycol were added to 900 parts of N,N-dimethylacetamide and evenly mixed to obtain a mixed slurry. The mixed slurry was coated on a surface of a diaphragm base layer through micro gravure coating and dried to obtain a diaphragm.

The diaphragm was a wet process substrate diaphragm with a thickness of 9 μm, and was coated on one surface, with a coating thickness of 3 μm, and a total surface density of the diaphragm is 10.6 g/m².

The above diaphragm, a positive electrode and a negative electrode are laminated or wound to prepare a lithium-ion battery cell, which is baked, filled with liquid, formed and encapsulated to obtain a high-safety lithium-ion battery.

Example 2

20 parts of a modification material were dissolved in ethanol under stirring to form a mixed solution, and 200 parts of boehmite were added. After stirring and mixing evenly, the solvent in the mixture was removed by vacuum-heating drying technology to obtain a particle of a ceramic material coated with the modification material. The modification material was selected from hydroxyethyl ethylenediamine triacetic acid substituted 3-aminopropyl trimethoxysilane.

In the prepared ceramic particle, a shell layer was a modification material containing hydroxyethyl ethylenediamine triacetic acid substituted 3-aminopropyl trimethoxysilane, and a core was boehmite; a mass ratio of the shell layer to the core was 20:200, a thickness of the shell layer was 10 nm, and an average particle diameter of the ceramic particle was about 0.8 μm.

The preparation methods of a diaphragm and a lithium-ion battery were the same as those of Example 1, except that the ceramic particle prepared above was used.

Example 3

20 parts of a modification material were dissolved in ethylene glycol under stirring to form a mixed solution, and 200 parts of aluminum oxide were added. After stirring and mixing evenly, the solvent in the mixture was removed by vacuum-heating drying technology to obtain a particle of a ceramic material coated with the modification material. The modification material was selected from pyridine substituted 3-aminopropyl trimethoxysilane.

In the prepared ceramic particle, a shell layer was a modification material containing pyridine substituted 3-aminopropyl trimethoxysilane, and a core was aluminum oxide; a mass ratio of the shell layer to the core was 20:200, a thickness of the shell layer was 10 nm, and an average particle diameter of the ceramic particle was about 0.8 μm.

The preparation methods of a diaphragm and a lithium-ion battery were the same as those of Example 1, except that the ceramic particle prepared above was used.

Example 4

20 parts of a modification material were dissolved in propylene glycol under stirring to form a mixed solution, and 200 parts of aluminum oxide were added. After stirring and mixing evenly, the solvent in the mixture was removed by vacuum-heating drying technology to obtain a particle of a ceramic material coated with the modification material. The modification material was selected from imidazole substituted 3-aminopropyl trimethoxysilane.

In the prepared ceramic particle, a shell layer was a modification material containing imidazole substituted 3-aminopropyl trimethoxysilane, a core was aluminum oxide; a mass ratio of the shell layer to the core was 50:200, a thickness of the shell layer was 20 nm, and an average particle diameter of the ceramic particle was about 0.9 μm.

The preparation methods of a diaphragm and a lithium-ion battery were the same as those of Example 1, except that the ceramic particle prepared above was used.

Example 5

20 parts of a modification material were dissolved in propylene glycol under stirring to form a mixed solution, and 200 parts of magnesium oxide were added. After stirring and mixing evenly, the solvent in the mixture was removed by vacuum-heating drying technology to obtain a particle of a ceramic material coated with the modification material. The modification material was selected from imidazole substituted 3-aminopropyl trimethoxysilane.

In the prepared ceramic particle, a shell layer was a modification material containing imidazole substituted 3-aminopropyl trimethoxysilane, and a core was magnesium oxide; a mass ratio of the shell layer to the core was 100:200, a thickness of the shell layer was 40 nm, and an average particle diameter of the ceramic particle was about 1.0 μm.

The preparation methods of a diaphragm and a lithium-ion battery were the same as those of Example 1, except that the ceramic particle prepared above was used.

Example 6

A particle of a ceramic material coated with a modification material was prepared in the same method as in Example 1.

60 parts of the ceramic particle prepared above, 40 parts of polymethyl methacrylate and 4 parts of polyethylene glycol were added to 900 parts of N,N-dimethylacetamide, and mixed evenly to obtain a mixed slurry. The mixed slurry was coated on a surface of a diaphragm base layer through micro gravure coating and dried to obtain a diaphragm.

The diaphragm was a wet process substrate diaphragm with a thickness of 9 μm, and was coated on one surface with a coating thickness of 3 μm, and a total surface density of the diaphragm was 10.6 g/m$^2$.

The above diaphragm, a positive electrode and a negative electrode are laminated or wound to prepare a lithium-ion battery cell, which is baked, filled with liquid, formed and encapsulated to obtain a high-safety lithium-ion battery.

Example 7

A particle of a ceramic material coated with a modification material was prepared in the same method as in Example 1.

95 parts of the ceramic particle prepared above and 5 parts of styrene butadiene rubber were added to 900 parts of N-methyl-2-pyrrolidone (NMP), and mixed evenly to obtain a mixed slurry. The mixed slurry was coated on a surface of a diaphragm base layer through micro gravure coating and dried to obtain a diaphragm.

The diaphragm was a wet process substrate diaphragm with a thickness of 9 μm, and was coated on one surface with a coating thickness of 3 μm, and a total surface density of the diaphragm was 10.6 g/m$^2$.

The above diaphragm, a positive electrode and a negative electrode are laminated or wound to prepare a lithium-ion battery cell, which is baked, filled with liquid, formed and encapsulated to obtain a high-safety lithium-ion battery.

Comparative Example 1

80 parts of alumina ceramic particle, 20 parts of polyvinylidene fluoride-hexafluoropropylene and 2 parts of polyethylene glycol were added to 900 parts of N,N-dimethylacetamide, and mixed evenly, to obtain a mixed slurry. The mixed slurry was coated on a surface of a diaphragm base layer through micro gravure coating and dried to obtain a diaphragm.

The diaphragm was a wet process substrate diaphragm with a thickness of 9 μm, and was coated on one surface with a coating thickness of 3 μm, and a total surface density of the diaphragm was 10.6 g/m$^2$.

The above diaphragm, a positive electrode and a negative electrode are laminated or wound to prepare a lithium-ion battery cell, which is baked, filled with liquid, formed and encapsulated to obtain a high-safety lithium-ion battery.

Comparative Example 2

20 parts of ethylenediamine tetraacetic acid, 80 parts of alumina ceramic particle, 20 parts of polyvinylidene fluoride-hexafluoropropylene and 2 parts of polyethylene glycol were added to 900 parts of N,N-dimethylacetamide, and mixed evenly to obtain a mixed slurry. The mixed slurry was coated on a surface of a diaphragm base layer through micro gravure coating, and dried to obtain a diaphragm.

The diaphragm was a wet process substrate diaphragm with a thickness of 9 μm, and was coated on one surface with a coating thickness of 3 μm, and a total surface density of the diaphragm was 10.6 g/m$^2$.

The above diaphragm, a positive electrode and a negative electrode are laminated or wound to prepare a lithium-ion battery cell, which is baked, filled with liquid, formed and encapsulated to obtain a high-safety lithium-ion battery.

Test Example 1

The lithium-ion batteries prepared in Examples 1-7 and Comparative Examples 1-2 were subjected to voltage tests and internal resistance tests. The test process was to fully charge the lithium-ion batteries prepared in Examples 1-7 and Comparative Examples 1-2, and place them in an environment of 25° C. and a humidity of 50%, and then test voltages and internal resistances of batteries in a fully charged state with a voltage internal resistance meter (Amber-Applent, model AT526B). The results are shown in Table 1.

TABLE 1

Voltage and internal resistance test results of the lithium-ion batteries in Examples 1-7 and Comparative Examples 1-2

| Serial number of samples | Average voltage of lithium-ion batteries | Internal resistance of lithium-ion batteries |
| --- | --- | --- |
| Example 1 | 4.2016 V | 12.18 mΩ |
| Example 2 | 4.2011 V | 12.32 mΩ |
| Example 3 | 4.2012 V | 11.98 mΩ |
| Example 4 | 4.2008 V | 12.21 mΩ |
| Example 5 | 4.2011 V | 11.97 mΩ |
| Example 6 | 4.2009 V | 11.87 mΩ |
| Example 7 | 4.2003 V | 12.05 mΩ |
| Comparative Example 1 | 4.2010 V | 12.36 mΩ |
| Comparative Example 2 | 4.2017 V | 18.35 mΩ |

In Examples 1-7, particles of the ceramic materials coated with the modification materials were applied in the diaphragms and assembled into lithium-ion batteries. It can be known from the data in Table 1, after lithium-ion batteries prepared in Examples 1-7 and Comparative Examples 1-2 were stored, the voltages were normal, but the internal resistance of the battery of Comparative Example 2 was significantly increased. This was mainly because a direct addition of the modification material into the slurry, which would affect a permeability of lithium ions.

Figure 4:
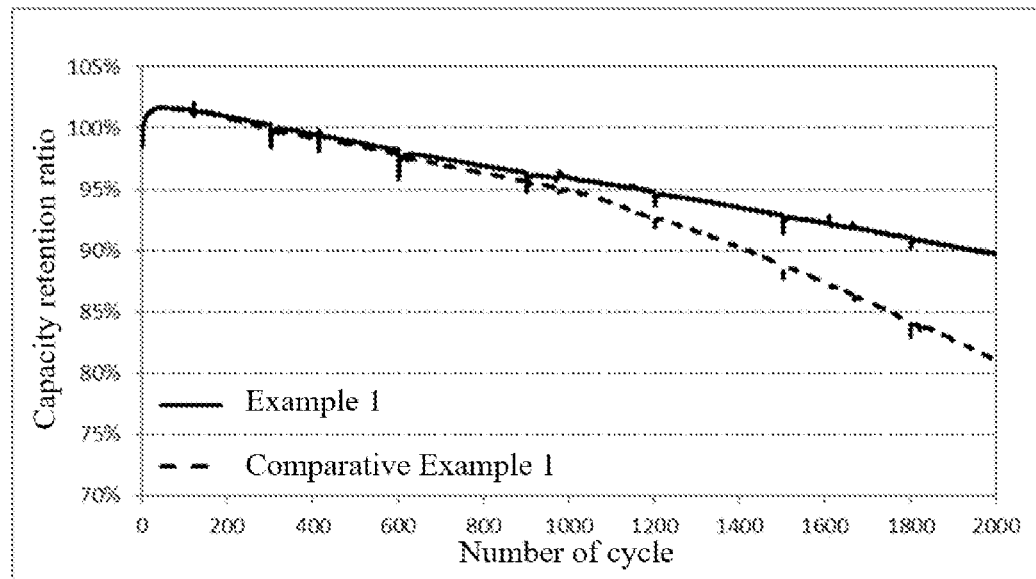
FIG. 4: a graph of cycle test results of batteries using diaphragms of Example 1 and Comparative Example 1.
Figure 5:
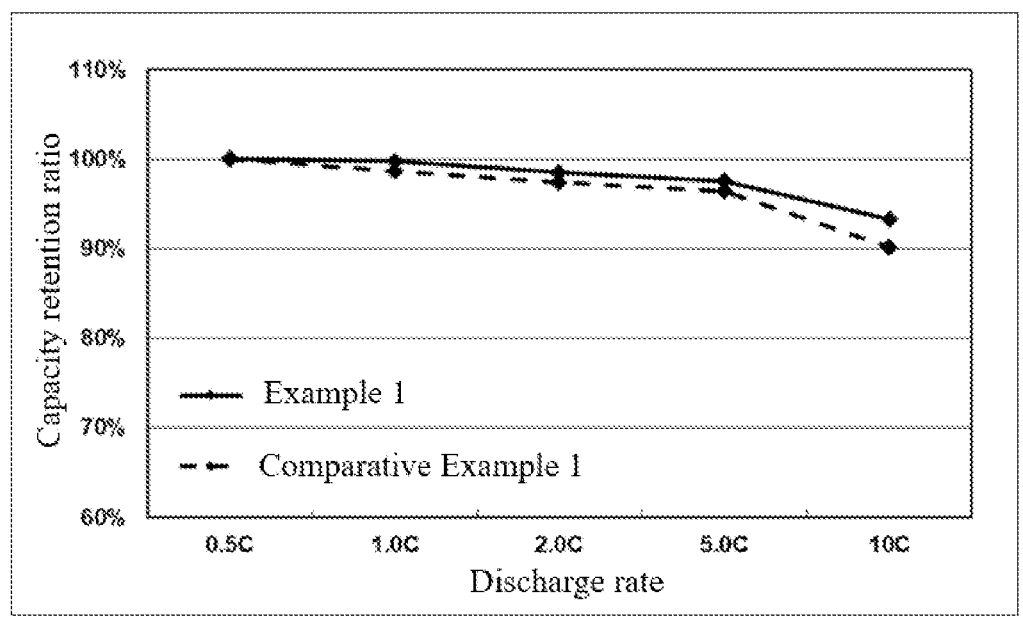
FIG. 5: a graph of rate test results of batteries using diaphragms of Example 1 and Comparative Example 1.

Lithium-ion batteries prepared in Example 1 and Comparative Example 1 were subjected to charge-discharge cycle and rate performance tests, and the charge-discharge cycle test was performed using a 1 C charge/1 C discharge regime; the rate performance test was performed using 0.2 C charge/0.2 C, 0.5 C, 1 C, 3 C and 5 C discharge regimes. The results are shown in FIG. 4 and FIG. 5. It can be seen from FIG. 4 and FIG. 5 that the battery of Example 1 not only maintains a good capacity retention ratio at a later stage of the cycle, but also maintains a good capacity retention ratio under a high rate discharge of the battery.

By comparing the experimental results of Examples 1-7 and Comparative Examples 1-2, the following conclusions were drawn:

1. if the modification material was directly added to the coating layer and applied in the diaphragm of the lithium-ion battery, the modification material will affect the permeability of lithium ions in the lithium-ion battery, resulting in an increase of the internal resistance of the lithium-ion battery; and
2. in Examples 1-7, particles of the ceramic materials coated with the modification materials are used and are applied in the diaphragms of the lithium-ion batteries, which has no influence on the internal resistances, voltages and charge-discharge cycles of the lithium-ion batteries, meeting application requirements.

Test Example 2

Diaphragms of the lithium-ion batteries prepared in Examples 1-7 and Comparative Examples 1-2 were subjected to metal ions tests. The test process was as follows:

diaphragms prepared in Examples 1-7 and Comparative Examples 1-2 with a size of 100 mm*100 mm were taken and each placed in beakers containing 100 ml of 0.1 wt % $CoCl_2$ aqueous solution, then the beakers were placed on a heating plate at 150° C. for 30 min, then diaphragms were taken out after cooling, and subjected to ICP test and analysis.

ICP test results were as follows:

| Serial number of samples | Content of Co (ppm) |
| --- | --- |
| Example 1 | 177 |
| Example 2 | 181 |
| Example 3 | 183 |
| Example 4 | 205 |
| Example 5 | 227 |
| Exampl e6 | 178 |
| Example 7 | 182 |
| Comparative Example 1 | 126 |
| Comparative Example 2 | 183 |

From the above data, it can be seen that the diaphragms after adding the modified ceramic particles have a significantly increased adsorption capacity for metal ions.

Test Example 3

Lithium-ion batteries prepared in Example 1 and Comparative Example 1 were disassembled after recycling, and their diaphragms and negative electrodes were subjected to ICP test, and the test results were as follows:

| Serial number of samples | Diaphragms (ppm) | Negative electrodes (ppm) |
| --- | --- | --- |
| Example 1 | 1275 | 336 |
| Comparative Example 1 | 267 | 1130 |

From the above data, it can be seen that the diaphragms after adding the modified ceramic particles have a significantly increased adsorption capacity for metal ions, thereby ensuring the cycle performance of the batteries.

The embodiments of the present application have been described above. However, the present application is not limited to the above embodiments. Any modification, equivalent replacement, improvement, etc. made within the spirit and principles of the present application shall be included in the protection scope of the present application.

What is claimed is:

1. A ceramic particle, having a core-shell structure, wherein the core-shell structure comprises a shell layer and a core, a material for forming the shell layer comprises a modification material, and a material for forming the core comprises an inorganic ceramic material;
   the modification material is a substituted siloxane, and a compound for forming a substituent is selected from a carboxyl-containing amine compound or a nitrogen-containing heterocyclic compound;
   wherein the carboxyl-containing amine compound is selected form one or more of ethylenediamine tetraacetic acid, propylene diamine tetraacetic acid, hydroxyethyl ethylenediamine triacetic acid, and ethylene glycol diethyl ether diamine tetraacetic acid;
   wherein the nitrogen-containing heterocyclic compound is selected from one or two of pyridine and imidazole.

2. The ceramic particle according to claim 1, wherein the siloxane is an amino-containing siloxane.

3. The ceramic particle according to claim 1, wherein the siloxane is selected from one or more of 3-aminopropyl trimethoxysilane, 3-aminopropyl triethoxysilane, 2-aminoethyl trimethoxysilane, and 2-aminoethyl triethoxysilane.

4. The ceramic particle according to claim 1, wherein the inorganic ceramic material is selected from one or more of alumina, magnesium oxide, boehmite, barium sulfate, barium titanate, zinc oxide, calcium oxide, silicon dioxide, silicon carbide, and nickel oxide.

5. The ceramic particle according to claim 1, wherein a thickness of the shell layer is 5 nm-1000 nm.

6. The ceramic particle according to claim 1, wherein an average particle diameter of the inorganic ceramic material is 0.01 μm-20 μm.

7. A preparation method of the ceramic particle according to claim 1, comprising the following steps:
   coating, by a silanization treatment method, the material for forming the shell layer on a surface of the material for forming the core to prepare the ceramic particle; wherein the ceramic particle has the core-shell structure, the core-shell structure comprises the shell layer and the core, the material for forming the shell layer comprises the modification material, and the material for forming the core comprises the inorganic ceramic material.

8. The preparation method according to claim 7, wherein the silanization treatment method comprises the following steps:
   adding the material for forming the shell layer to a solvent under stirring to form a solution containing the material for forming the shell layer; adding the material for forming the core into the solution, stirring and mixing evenly to obtain a mixed system; removing the solvent in the mixed system through vacuum-heating drying or spray drying to obtain the ceramic particle.

9. A diaphragm comprising a diaphragm base layer and a coating layer located on at least one surface of the diaphragm base layer, wherein the coating layer is obtained by coating a mixed system containing the ceramic particle according to claim 1 on the at least one surface of the diaphragm base layer.

10. The diaphragm according to claim 9, wherein a thickness of the coating layer is 1-10 μm; the coating layer with the thickness is obtained by one coating or multiple coating.

11. The diaphragm according to claim 9, wherein the diaphragm comprises the diaphragm base layer and the coating layers located on both surfaces of the diaphragm base layer, and the thicknesses of the coating layers on the both surfaces are the same or different.

12. The diaphragm according to claim 9, wherein the mixed system further comprises at least one of a polymer binder and an additive;
    parts by mass of each component in the mixed system are as follows:
    50-95 parts by mass of the ceramic particle, 5-40 parts by mass of the polymer binder, and 0-10 parts by mass of the additive.

13. The diaphragm according to claim 12, wherein parts by mass of each component in the mixed system are as follows:
    60-95 parts by mass of the ceramic particle, 10-30 parts by mass of the polymer binder, and 0-5 parts by mass of the additive.

14. The diaphragm according to claim 12, wherein the mixed system further comprises 100-5000 parts by mass of a solvent.

15. The diaphragm according to claim 12, wherein the mixed system further comprises 500-2000 parts by mass of a solvent.

16. A preparation method of the diaphragm according to claim 15, comprising the following steps:
    (a) adding the ceramic particle according to claim 1, the polymer binder and optionally the additive to the solvent and mixing to obtain the mixed system; and
    (b) coating the mixed system of step (a) on a surface of the diaphragm base layer and drying to obtain the diaphragm.

17. The preparation method according to claim 16, wherein parts by mass of each component in the mixed system are as follows:
    60-95 parts by mass of the ceramic particle, 10-30 parts by mass of the polymer binder, 0-5 parts by mass of the additive, and 500-2000 parts by mass of the solvent.

18. A lithium-ion battery, comprising the diaphragm according to claim 9;
    wherein the lithium-ion battery further comprises a positive electrode, a negative electrode, and an electrolyte.

* * * * *